(12) United States Patent
Khan et al.

(10) Patent No.: US 6,246,573 B1
(45) Date of Patent: Jun. 12, 2001

(54) OPERATORY COMPUTER WITH PORTABLE DISPLAY

(75) Inventors: Ekramul Khan, Totowa, NJ (US); Michael J. Osbourne, Amherst, NH (US); Caleb Clark Crye, New York, NY (US); Enamul H. Khan, Totowa, NJ (US)

(73) Assignee: CIEOS, Inc., Totowa, NJ (US)

( * ) Notice: Subject to any disclaimer, the term of this patent is extended or adjusted under 35 U.S.C. 154(b) by 0 days.

(21) Appl. No.: 09/488,951

(22) Filed: Jan. 20, 2000

(51) Int. Cl.$^7$ .................................................. H05K 5/00
(52) U.S. Cl. ........................ 361/683; 361/724; 361/687; 312/223.2
(58) Field of Search ............................ 361/683, 724–727, 361/684–686, 740, 759; 248/551–553; 312/223.1–223.6; 70/14

(56) References Cited

U.S. PATENT DOCUMENTS

| | | | |
|---|---|---|---|
| 4,345,147 | 8/1982 | Aaron et al. | 235/385 |
| 4,438,458 | 3/1984 | Miinscher | 312/251 |
| 5,007,608 | 4/1991 | Carroll, Jr. | 248/297.2 |
| 5,196,993 | 3/1993 | Herron et al. | 361/683 |
| 5,245,558 | 9/1993 | Hachey | 364/708.1 |
| 5,318,356 | 6/1994 | Shelton | 312/223.1 |
| 5,321,579 | 6/1994 | Brown et al. | 361/681 |
| 5,586,002 | 12/1996 | Notarianni | 361/681 |
| 5,640,297 | 6/1997 | Labaze | 361/683 |
| 5,702,166 | 12/1997 | Lee | 312/223.2 |
| 5,745,340 | 4/1998 | Landau | 361/681 |
| 6,078,503 | * 6/2000 | Gallagher et al. | 361/725 |
| 6,101,089 | * 8/2000 | Seto et al. | 361/687 |

* cited by examiner

Primary Examiner—Leo P. Picard
Assistant Examiner—Hung Van Duong
(74) Attorney, Agent, or Firm—Lathrop & Clark LLP

(57) ABSTRACT

A wall mounted computer for used in an examining room or operatory such as employed in a dentist's or doctor's office. The computer is contained in a shallow metal box which is mounted between wall studs or on the surface of a wall. Mounted to the metal box beneath the computer is one or more mass storage devices which may be accessed from beneath a horizontal support plate. A connector bracket provides convenient access to data input or output connectors. The connector bracket is recessed with respect to the mass storage devices so that cables do not block access to the mass storage devices. A translucent plate is mounted by binges to cover the access to the mass storage devices and the connector bracket to protect them from contamination. A flat panel display is removably mounted on an articulated post to the metal box. The flat panel display may be viewed while mounted on the post, or may be removed for more convenient viewing by a patient or by medical personnel.

15 Claims, 5 Drawing Sheets

OPERATORY COMPUTER WITH PORTABLE DISPLAY

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The present invention relates to computers, monitors, and cabinets in general, and to wall mounted computers and monitors in particular.

Computers have long been used for record keeping and billing functions within a doctor's or dentist's office. More recently, sophisticated diagnostic equipment has incorporated computers for processing imaging and other diagnostic data. In addition, modern electronic displays have found use in communicating with patients concerning diagnosis and treatment options. The availability of miniature cameras has allowed dentists to capture digital images of a patient's dental work, allowing problem areas and proposed treatment options to be discussed with the patient with greater clarity. Miniaturized circuitry has enabled such techlnologies as digital intra-oral cameras, and digital x-ray devices. In addition, informative videos, recorded on interactive DVD disks may be provided to assist the patient in understanding proposed procedures.

In the past, doctors and dentists often worked with models to illustrate pathologies and proposed corrective treatment options. Today real time manipulable computer models can be used. These models can offer greater fidelity and a wider range of muscle, organ, orthopedic, dental, and procedural models and are potentially lower cost and more quickly available to the treating medical personnel. Further, the potential exists for recording and emailing a computer based patient discussion to the patient's home computer. Computer models can be used for capturing digital images and displaying reconstructed dentistry or cosmetic surgery thereby providing reassurance and motivation to patients undergoing progressive and time consuming procedures.

The rapid introduction of computer-based imaging and patient communication into existing medical offices, however, presents a problem. Most examination rooms were designed before the development of computer display systems, and, even in new construction, the cost of space drives examination spaces (opratories) to the minimum size which is practical. The typical solution of a cart mounted computer and monitor can result in undesirable crowding of the examination room. The power, monitor, and camera cords further restrict movement when such equipment is in use. Where several systems are needed the problem becomes critical.

What is needed is a way to integrate a computer into an examination room while minimizing equipment footprint and maximizing accessibility.

SUMMARY OF THE INVENTION

A general purpose Windows-Intel based computer is mounted between wall studs. The mounting has a metal box which attaches between a pair of studs and a computer box, a removable support structure for a mass storage device, and a connector bracket which is removably fastened to the metal box. The computer box has a peripheral molding, a component housing enclosed by two vertical sides of the computer box, an upper horizontal side, a transverse horizontal support extending between the two vertical sides, and a metal panel extending from the transverse support to a position adjacent the sides and top of the computer box. A translucent panel is mounted to the transverse support below the metal plate. The translucent panel overlies the connector bracket when positioned parallel to the metal panel. The translucent panel may be pivoted about the hinge mounting, to provide access to electrical or optical connectors mounted to the connector bracket below the computer. Rotation of the translucent panel also provides access to mass storage devices, in particular a DVD-ROM player, and a floppy disk drive from beneath the transverse support. A monitor support post is mounted to the transverse support. The support post is mounted to pivot towards and away from the metal panel from approximately vertical to an angle of fifteen degrees from the vertical. A flat panel monitor is removably mounted on the support post. The monitor has a frictional type mounting which allows the monitor to rotate about an axis defined by the post. The monitor is connected by a cable to the computer box so that the monitor may be removed from the post and held by a patient or medical technician or mounted on an article of furniture such as an examining chair.

An air permeable rubber gasket is positioned between the sides of the computer box and the metal panel. Fans mounted internally to the computer box draw air from beneath the translucent panel into the computer box. Air exits from the computer box through the permeable rubber gasket between the sides of the computer box and the metal panel. One or more sources of illumination may be mounted to the shelf beneath the transparent panel so that the transparent panel can be used to display dental x-rays. Alternative embodiments may include mounting the metal box on a wall exterior, and/or utilizing a wireless data link between the computer and the flat panel display. The flat panel display may also be connected to a data port located apart from the computer box. For example, if the display is releasably mounted to an examination chair, a data port co-located on the chair could be used.

It is an object of the present invention to provide a display system which requires minimal examining room floor space and room volume.

It is a further object of the present invention to provide a computer and display system which can be comfortably viewed by a patient.

It is another object of the present invention to provide a computer for use in an examining room which is resistant to contamination by fluids.

It is a yet further object of the present invention to provide a computer for use in an examining room which is easily cleaned with disinfectant.

Further objects, features and advantages of the invention will be apparent from the following detailed description when taken in conjunction with the accompanying drawings.

DESCRIPTION OF THE PREFERRED EMBODIMENTS

Figure 1:
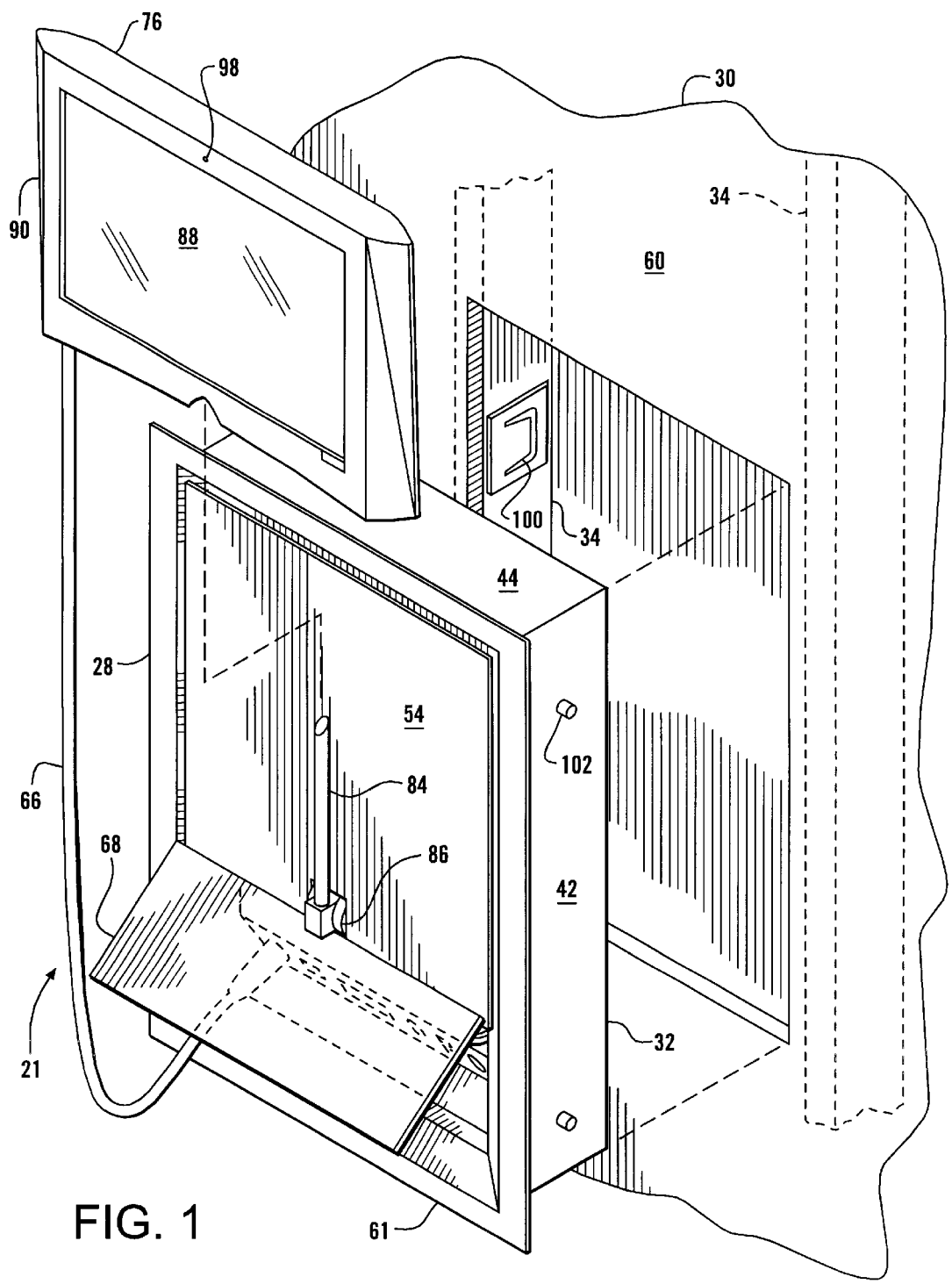
FIG. 1 is a top isometric view of the computer system of this invention.
Figure 1A:
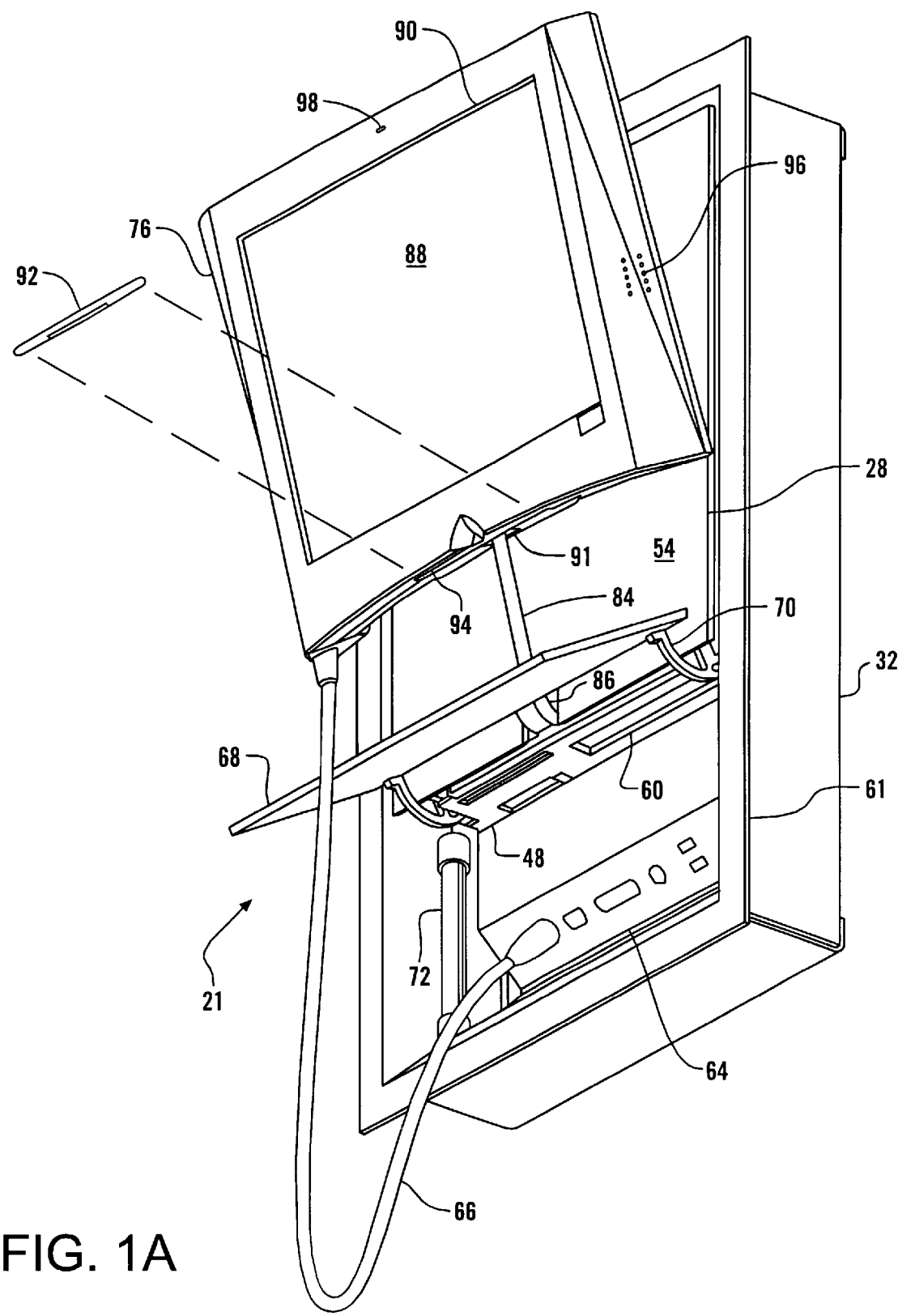
FIG. 1A is a bottom isometric view of the computer system of FIG. 1.
Figure 2:
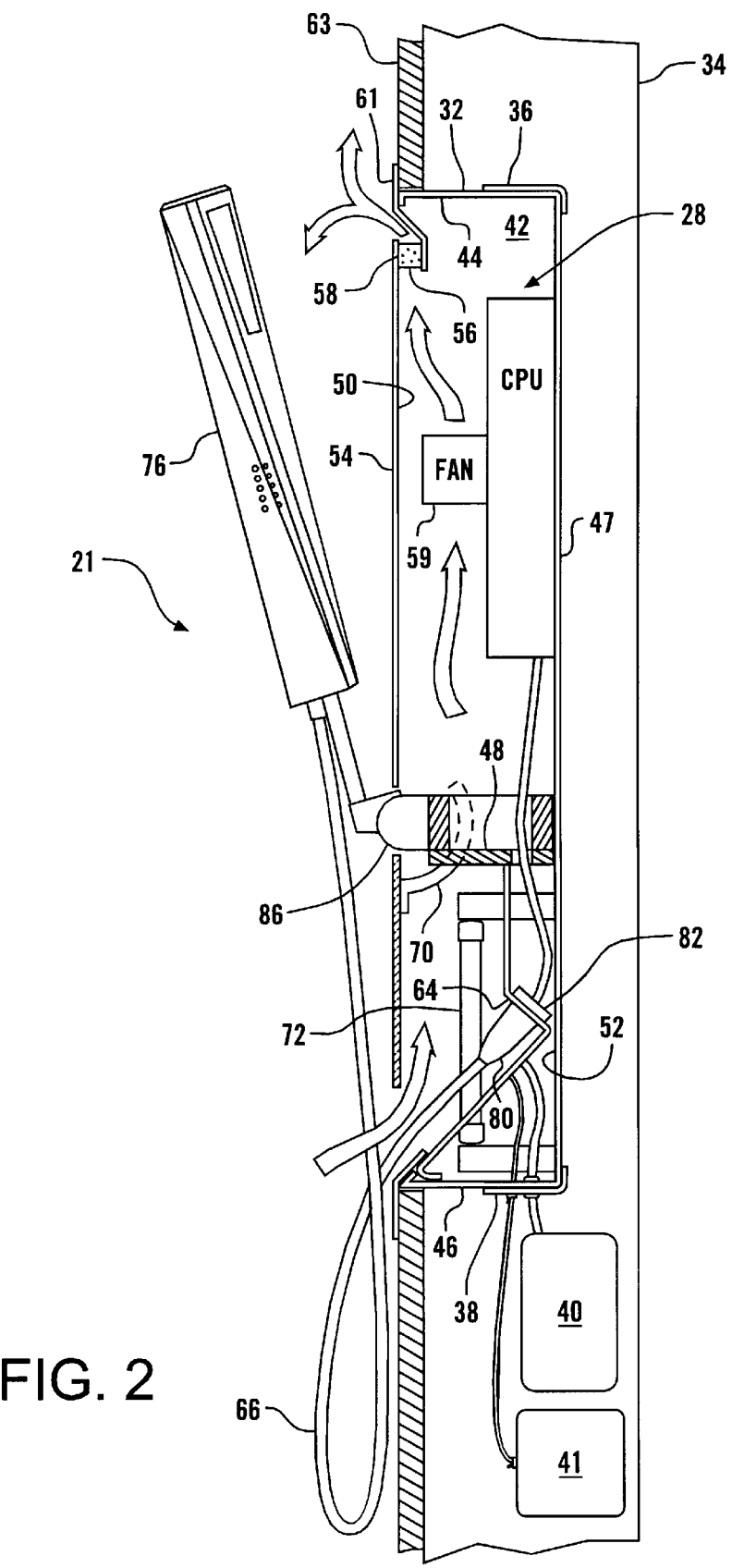
FIG. 2 is a side view, partially cut away in section, of the system of FIG. 1.
Figure 3:
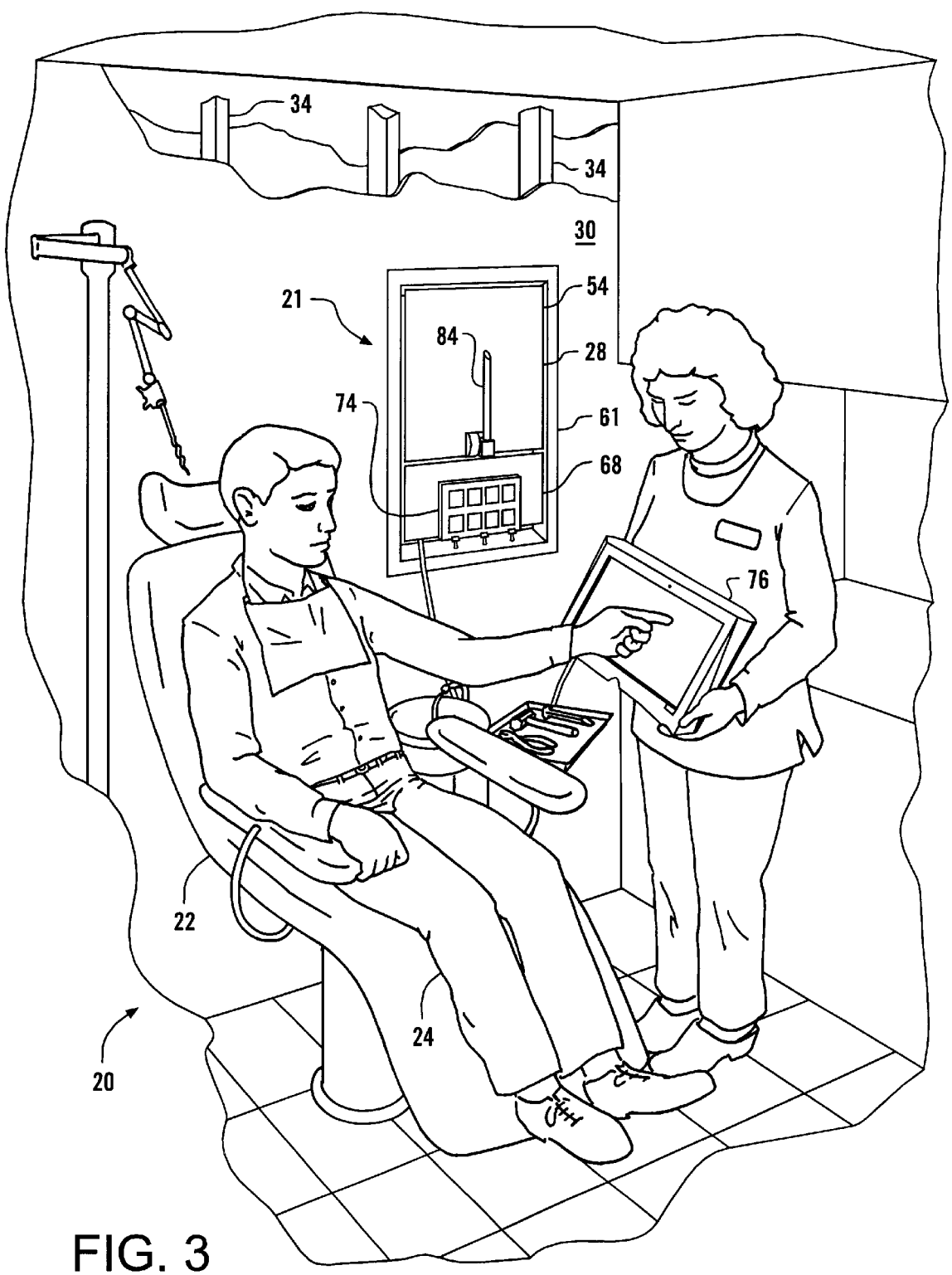
FIG. 3 is a pictorial view of the system of FIG. 1 mounted within the wall of a dental operatory, and showing operation of the flat panel monitor remote from the computer box in proximity to the patient.

Referring more particularly to FIGS. 1–4, wherein like numbers refer to similar parts, an examining room or operatory 20 is shown in FIG. 3. The examining room 20 contains a chair 22 in which a patient 24 is examined, instructed or undergoes a therapeutic procedure. The computer system 21 of this invention is mounted compactly within the room 20. With the availability of modern electronic capabilities it is becoming more and more important to be able to display for the patient 24 information gathered from video cameras, x-ray equipment, ultrasonic sensors and other devices. Moreover, computer animated models, instructional videos, and reconstructed simulations require the availability of a convenient display, processing and control device for ready interactive demonstration to the patient 24. The computer system 21 has a movable interactive monitor 76, communicating with a computer 28 which is mounted in the room 20. The computer and display may be used for showing the patient x-rays, informational videos, diagnostic information, and other computer based software applications, such as appointment scheduling, medical history gathering and billing and payment.

To minimize space and maximize convenient positioning of the computer 28, the computer is mounted to the examining room wall 30. The computer 28 is preferably mounted within a shallow metal box 32 which is recessed between two studs 34 forming part of the examining rooms wall 30. The metal box 32 is mounted to a metal frame 36 which is screwed to the studs 34. If the studs are wood, small metal plates may be nailed to the studs to facilitate attachment of the metal frame 36. A horizontal member 38 is part of the metal frame 36 and extends between the studs 34. Mounted within the wall beneath the frame 36 are a utility box 40 which is supplied with conventional AC power, and one or more data ports 41, such as access to a network, the world wide web, etc.

The computer 28 mounted within the metal box 32 is assembled of conventional components and standard mounting brackets. For clarity, most of the wiring and components have been omitted in the drawings. The conventional components include a processor mounted to a motherboard, various standard and custom driver boards, a hard disk and random access memory. The computer 28 is intended to be of a general purpose type, for example an Intel based processor running Microsoft Windows®. The metal box 32 has two vertical sides 42, a top side 44, a bottom side 46, a box back 47, and a transverse support 48 which divides the box 32 into a computer compartment 50 and an input/output compartment 52.

The computer compartment 50 is covered by a metal plate 54 which is mounted to the metal box 32 so that a gap 56 is formed between the metal plate 54 and the top 44 and side 42 plates, and the transverse support 48. This gap 56 is filled by an elastic filter material 58 which provides Faraday shielding, ventilation, and protection from contamination by dust and other airborne contaminants. A fan 59 within the computer compartment 50 draws cooling air upwardly through the filter 58 between the metal plate 54 and the transverse support 48, and outwardly through the filter 58 at the top of the computer compartment 50. A peripheral molding 61 surrounds the metal box 32, sealing the box 32 to the outer surface 63 of the wall 30.

A DVD-ROM player 60, and a floppy disk drive 62 are positioned rearward of the plate 54 and the filter 58, and extending upwardly from the transverse support 48. The DVD player 60 and floppy drive 62 are connected to drivers forming part of the computer 28. The DVD player and floppy disk drive are generally referred to herein as devices which receive removable mass storage elements. The term removable mass storage element would also encompass cassette tapes, flash memory cards, Smart Sticks, CD-ROMS, optical digital tape, or any such removable element for storing a quantity of data. Access to the DVD player 60 and the floppy disk drive 62 is from beneath the transverse support plate 48. Because it is necessary for hygienic purposes to be able to wipe down surfaces which are exposed to the examining room, it is desirable that all openings into the computer 28 be shielded from fluid splatter which often results from coughing, sneezing, and the performance of therapeutic procedures within the room 20.

Figure 4:
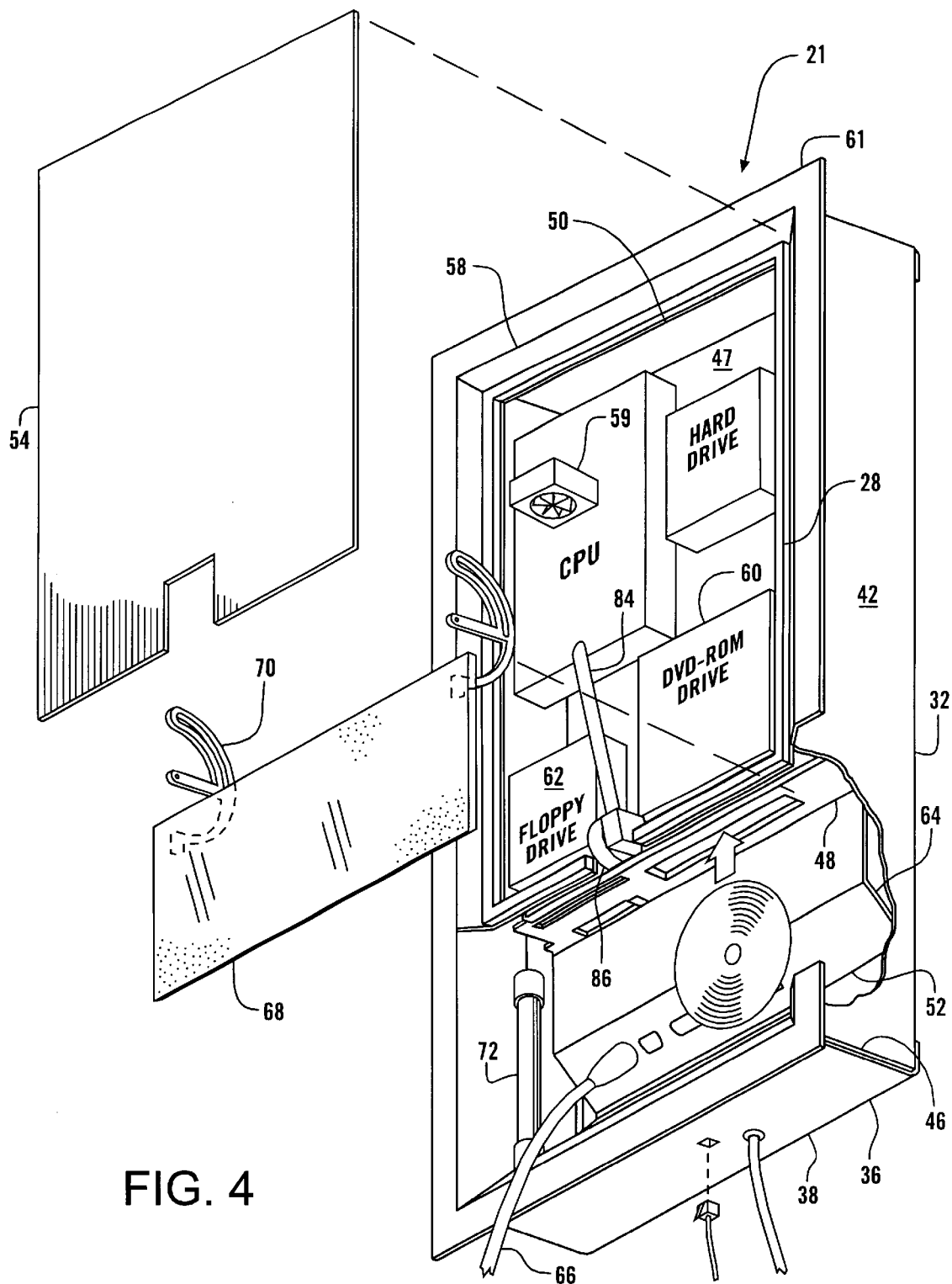
FIG. 4 is an exploded bottom isometric view, partially broken away in section, of the system of FIG. 1.

As shown in FIG. 4, a translucent panel 68 is mounted by hinges 70 to the transverse support 48 and pivots outwardly to allow access to the data storage drives 60, 62. A connector bracket 64 is mounted within the metal box 32 below the transverse support 48 to be covered by the panel 68. The connector bracket 64 slopes downwardly so that cables 66 connected to the bracket 64 slope away from the space below the transverse support 48, which must be kept clear for inputting and removing the removable high density storage media Such as DVD's, CD's, and floppy diskettes.

The translucent panel 68 functions as a splatter shield which can easily be cleaned with disinfectant. Fluorescent lights 72 are mounted within the box 32 adjacent the sides 42 on either side of the connector bracket 64. The lights 72 illuminate the rear side of the translucent panel 68. The illuminated panel 68 forms a light-box to which dental x-rays 74 can be clipped for display.

The computer 28, by means of a video card or circuit, drives a flat panel monitor 76. The monitor 76 is connected by the cable 66 to a connector 80 which plugs into the computer 28 through a connector 82 mounted on the connector bracket 64. The monitor 76 is mounted on an axially extending post 84 which is mounted to a clutch bracket 86 which provides frictional positioning between a vertical position and a position inclined approximately fifteen degrees outwardly from the vertical. The clutch bracket 86 is mounted next to the transverse support 48 inside the computer compartment 50. The monitor 76 has a touch sensitive flat panel screen 88 mounted within a frame 90. The flat panel technology screen, for example an active matrix liquid crystal display, is mounted together with any necessary electronics within the frame. The frame 90 has a friction clutch hole 91 which mounts on the end of the post 84 and provides friction controlled rotation of the monitor 76 about an axis defined by the post 84. A stylus or touch pen 92 is mounted to the frame 90 on the side adjacent the clutch hole 91. The stylus 92 is mounted within a retaining clip 94. The monitor 76 may be provided with speakers 96, and a microphone 98 for audio input and output.

In operation, the monitor may be viewed by medical personal while supported on the post 84, but more commonly, the monitor 76 will be removed from the post 84 and shown to or handed to the patient 24. The stylus 92 can be used to input data by writing on the screen 88, to select menu choices, or to function as a pointing device for use with a graphic interface or used in a more sophisticated manner to sketch within an illustration program. The monitor is thus selectably removable from the post for positioning at the convenience of medical personnel, or in proximity to the patient, as shown in FIG. 3, for convenient viewing of information on the display.

Alternatively, a wired hot shoe may be mounted on an ancillary support, for example on the patient chair 22, and the monitor may be disconnected from its cable 66 and engaged with the hot shoe on the chair to supply the monitor with data from the computer and with power.

The computer 28 may also be mounted to the examining room wall exterior where space is slightly less critical and ease of mounting within an existing examining room is a greater concern. When the computer 28 is located on the wall 30 exterior, power and data lines may be brought through the wall to the computer within the box 32, either through the back 47 or by use of a cord to a nearby utility box.

It should be understood that the connection between the monitor and the computer may transmit both power and information, or a portable power supply could be incorporated within the monitor 76 so that only information would need to be supplied. If only data is communicated to and from the monitor 76 then a simpler lighter weight cord or preferably a wireless data link could be used. The wireless link might employ radio frequency, infrared or optical data links. If a portable power supply is incorporated within the display, some method of recharging the power supply will be necessary. Therefore, when the display is docked on the post, an electrical or inductive connection will be necessary.

It should be understood that for case of maintenance it is preferable that the computer be readily removable from the wall. This can be accomplished by locking the box 32 to the frame 36 with a simple mechanical interface as will be understood by those skilled in the art. An example would be protrusions 102 on the outwardly facing surfaces of the vertical sides 42 which are received within brackets 100 mounted to the metal frame 36.

It should be understood that the frame 36 may be a shallow box with a rear wall, or only a frame, or minimally: mounting brackets. The frame 36 may be itself mounted with the aid of brackets to metal or wooden studs. A utility box 40 may be mounted to the frame 36 or to another member spaced from the frame 36.

It will be noted that the input/output compartment 52 may be provided with an array of conventional or specialized data connections, for example, USB, IEEE 1394 (FIRE WIRE®), serial ports, parallel ports, SCSI ports, Super VHS ports, coaxial ports, fiber optic ports, component video, and other attachment means. By providing all these connections on the wall, various accessory devices such as intra-oral cameras, x-ray and diagnostic devices, and other machines which are developed or acquired by the medical facility after installation of the computer system, are conveniently directed to a single user interface.

It should be understood that the flat panel display is not limited to a particular technology but can employ any suitable technology preferably technology which facilitates light weight and minimal power usage.

It is understood that the invention is not limited to the particular construction and arrangement of parts herein illustrated and described, but embraces such modified forms thereof as come within the scope of the following claims.

What is claimed is:

1. A stud wall housing a computer, comprising:
    a plurality of studs defining a wall, the wall having an interior face;
    a pair of said plurality of studs defining a space between said pair of studs,
    a metal box mounted within the space between the pair of studs;
    a vertically oriented computer box having two vertical sides and a horizontal top releasably mounted to the metal box, the computer box having a frame which overlies the interior face of the wall, wherein a front vertical panel comprised of a metal plate is mounted to the computer box, the vertical panel defining a gap between the vertical panel and the computer box two vertical sides and the horizontal top;
    a utility box having plugs mounted interior to the wall and cables extending from the plugs to the computer box to supply electricity and a data link;
    an air permeable gasket positioned close to the gap defined between the vertical panel and the computer box;
    a transverse horizontal support extending between the two vertical sides and positioned below the metal panel;
    a general purpose computer mounted within the box;
    a removable mass storage element reader accessible through an opening in the transverse horizontal support;
    a monitor support post defining an axis, the support post mounted to the transverse horizontal support and extending upwardly toward the metal panel, and pivotally mounted for motion towards and away from the metal panel;
    a flat panel monitor pivotally mounted for rotation on the support post about the axis defined by the support post, and removable from said support post so that the flat panel monitor may be held or positioned for viewing spaced from the wall.

2. The apparatus of claim 1 further comprising: a panel mounted by hinges to the transverse horizontal support, the panel positionable to overlie the opening in the transverse horizontal support.

3. The apparatus of claim 2 wherein the panel is translucent, and further comprising at least one electric light mounted to the metal box so that the panel forms a means for displaying x-rays.

4. A stud wall housing a computer comprising:
    a plurality of studs defining a wall, the wall having, an interior face;
    a pair of said plurality of studs defining a space between said pair of studs,
    a metal box mounted within the space between the pair of studs;
    a utility panel mounted interior to the wall and accessible to the metal box;
    a vertically oriented computer box having two vertical sides and a horizontal top releasably mounted to the metal box, the computer box having a front vertical panel formed of a metal plate mounted to the computer box;
    a transverse horizontal support extending between the two vertical sides and positioned below the metal panel;
    a general purpose computer mounted within the box;
    a flat panel monitor removably mounted to the box.

5. The apparatus of claim 4 further comprising a panel mounted by hinges to the transverse horizontal support, the panel being pivotable downwardly from the transverse horizontal support.

6. The apparatus of claim 5 wherein the panel is translucent, and further comprising at least one electric light mounted to the metal box so that the panel forms a means for displaying x-rays.

7. A wall mounted computer comprising:

a box fixed to the inwardly facing surface of a wall, the box opening frontwardly;

a plate fixed to the box to overlie the opening, and to define a peripheral gap above and below the plate;

an air permeable gasket positioned within the gap, restricting the entrance of dust and fluids, but permitting the flow of air therethrough, wherein air flows inwardly to the box from beneath the front panel, and exits the box upwardly above the panel;

a monitor releasably supported on the box, and disposed frontwardly of the front panel; and a central processing unit within the box, wherein the monitor is in connected in data sending and receiving relation to the central processing unit.

8. The wall mounted computer of claim 7 further comprising a transverse horizontal support extending between two vertical sides of the box and positioned below the metal panel;

a removable mass data storage element reader, having an opening for data mass storage elements which faces downwardly and which is accessible through the transverse horizontal support.

9. The wall mounted computer of claim 7 further comprising a monitor support post defining an axis, the support post mounted to the transverse horizontal support and extending upwardly, and the post being pivotally mounted for motion towards and away from the metal panel, the monitor being pivotally mounted for rotation on the support post about the axis defined by the support post.

10. A wall and computer assembly comprising:

a wall comprising a plurality of upwardly extending studs and a wall surface which faces the interior of a room;

a box fixed to the wall;

a central processing unit mounted within the box;

a transverse horizontal support extending within the box, positioned below the central processing unit;

a reader for removable mass storage elements, the reader being fixed to the horizontal support and having a downwardly facing opening to allow the insertion and removal of mass storage elements from below the support;

a communications bracket mounted to the box below the horizontal support and having a plurality of connectors thereon which face downwardly and frontwardly, the connectors be spaced rearwardly of the mass storage reader opening, such that a mass storage element may be inserted into the opening over cables extending from the connectors; and a monitor in data receiving and transmitting relationship with the central processing unit, the monitor being releasably connected to the box above the transverse horizontal support.

11. The assembly of claim 10 wherein the box is mounted between two studs, and extends substantially rearwardly of the wall surface to be recessed within the wall, and wherein a metal frame is connected to the box which extends outwardly to overlie the wall surface.

12. A wall mounted computer assembly comprising:

a box fixed to a wall, and having a frontwardly facing opening;

a central processing unit mounted within the box;

a front panel which overlies the central processing unit;

a monitor releasably mounted to the box at a position frontward of the front panel, the monitor being in data sending and receiving relation with the central processing unit;

a translucent panel positioned below the front panel, and pivotably attached to the box to extend between a closed position, in which the translucent panel is substantially parallel to the front panel, and an open position, in which the translucent panel is angled outwardly from the front panel to allow access to at least one data input/output connectors positioned rearwardly of the translucent panel; and at least one light source positioned rearwardly of the translucent panel, such that in the translucent panel closed position, x-ray image elements may be positioned over the illuminated translucent panel and examined thereon.

13. A wall and computer assembly, comprising:

a plurality of studs defining a wall, the wall having a surface which bridges multiple studs and which faces a room interior;

an upwardly extending box fixed to the wall and having a frontwardly facing opening;

a general purpose computer mounted within the box;

a front panel connected to the box to overlie the frontwardly facing opening;

a support post extending frontwardly and upwardly along an axis, the support post mounted to the box and extending frontwardly of the front panel, the support post being pivotable about a horizontal axis;

a touch screen monitor releasably mounted to the support post for rotation about the support post axis, the monitor being in data sending and receiving relation with the general purpose computer, wherein the monitor is removable from the support post so that the monitor may be held or positioned for viewing at a location spaced from the wall.

14. The apparatus of claim 13 further comprising: a panel mounted by hinges to a transverse horizontal support mounted within the box below the computer, the panel positionable to extend downwardly from the transverse horizontal support.

15. The apparatus of claim 14 wherein the panel is translucent, and further comprising at least one electric light mounted to the metal box so that the panel forms a means for displaying x-rays.

* * * * *